US008398040B2

(12) United States Patent
Busch

(10) Patent No.: US 8,398,040 B2
(45) Date of Patent: Mar. 19, 2013

(54) FASTENING APPARATUS FOR A PRESSURIZED-GAS VESSEL

(75) Inventor: Alexander Busch, Lübeck (DE)

(73) Assignee: Draeger Safety AG & Co. KGaA, Luebeck (DE)

( * ) Notice: Subject to any disclaimer, the term of this patent is extended or adjusted under 35 U.S.C. 154(b) by 238 days.

(21) Appl. No.: 12/801,342

(22) Filed: Jun. 4, 2010

(65) Prior Publication Data

US 2010/0313394 A1 Dec. 16, 2010

(30) Foreign Application Priority Data

Jun. 12, 2009 (DE) ......................... 10 2009 024 674

(51) Int. Cl.
*A47B 96/06* (2006.01)
*E04G 3/00* (2006.01)
*F16B 1/00* (2006.01)
*G09F 7/18* (2006.01)

(52) U.S. Cl. .................... 248/230.8; 248/230.1; 248/510

(58) Field of Classification Search ............... 248/230.1, 248/230.8, 510, 505, 506, 680, 313; 410/97, 410/100, 50; 24/69 R, 69 ST, 69 CT, 68 CD See application file for complete search history.

(56) References Cited

U.S. PATENT DOCUMENTS 1,849,789 A * 3/1932 Coffing ...................... 248/230.8
2,353,017 A * 7/1944 Denton ............................. 410/2
2,936,992 A * 5/1960 Browning ..................... 248/499
3,753,407 A * 8/1973 Tilseth ......................... 108/53.3
4,122,587 A * 10/1978 Weiss et al. ........................ 5/621
4,171,555 A 10/1979 Bakker et al.
4,310,110 A 1/1982 Dexter
5,173,996 A * 12/1992 Chou ......................... 24/68 CD
5,211,518 A * 5/1993 Mimica ........................... 410/50
5,271,387 A * 12/1993 Murray .................... 128/200.24
5,573,211 A * 11/1996 Wu ................................. 248/96
5,632,461 A * 5/1997 von Helms et al. ........ 248/218.4
5,934,658 A * 8/1999 Rydell et al. .................. 269/131
6,032,916 A * 3/2000 Holliday ....................... 248/505
6,065,796 A * 5/2000 Verduyn .................. 296/100.12
6,735,826 B2 * 5/2004 Uehara et al. ................... 24/170
6,966,732 B2 * 11/2005 Gohata ............................. 410/3
7,020,933 B2 * 4/2006 Chang ........................ 24/68 CD
7,296,658 B1 * 11/2007 Pederson ...................... 182/133
7,690,481 B1 * 4/2010 Pederson ...................... 182/133
7,712,191 B2 * 5/2010 Huang ........................ 24/68 CD
2001/0032378 A1 10/2001 Burt et al.

FOREIGN PATENT DOCUMENTS

DE 195 41 286 5/1997
DE 101 19 469 11/2002
JP 2000336502 12/2000

OTHER PUBLICATIONS

GB Combined Search and Examination Report, Sep. 23, 2010.

* cited by examiner

*Primary Examiner* — Terrell McKinnon
*Assistant Examiner* — Michael McDuffie
(74) *Attorney, Agent, or Firm* — Walter Ottesen P.A.

(57) ABSTRACT

A fastening apparatus for pressurized-gas vessels is provided on a carrier. The fastening apparatus makes it possible to fasten a pressurized-gas vessel as well as to adapt the fastening apparatus to differently sized pressurized-gas vessels with one manipulative step. The fastening apparatus includes a carrier, a belt, a locking device, fastening points and redirection points for the belt.

10 Claims, 4 Drawing Sheets

FASTENING APPARATUS FOR A PRESSURIZED-GAS VESSEL

CROSS REFERENCE TO RELATED APPLICATION

This application claims priority of German patent application no. 10 2009 024 674.6, filed Jun. 12, 2009, the entire contents of which is incorporated herein by reference.

FIELD OF THE INVENTION

The invention relates to a fastening apparatus for pressurized-gas vessels on a carrying system for breathing apparatus carriers thereof, such as divers or firemen.

BACKGROUND OF THE INVENTION

Fastening arrangements for pressurized-gas vessels on carrying systems for divers are used to attach the pressurized-gas vessels to a carrying system when these vessels are taken along on a dive. The pressurized-gas vessels are held on the carrying system with the assistance of straps, holding brackets or elastic belts. So that the pressurized-gas vessels are tightly connected to the carrying system and the connections cannot disengage during use, the belt is put under a holding tension during attachment of the pressurized-gas vessel and the holding tension is maintained for the duration of use in that the belt is fixed in this position. The application of the holding tension results from pulling and tightening the slack segment of the belt and the fixation of the belt takes place with the aid of a locking element.

The term "slack segment" of a belt in the present invention is understood as portions of the belt which are wrapped around the pressurized-gas vessel and are loosely and movably guided around the circumference of the pressurized-gas vessel to be fastened. Especially, a possible shiftability perpendicular to the tension direction of the belt is an indication that slack segments are present in the belt.

German patent publication 195 41 286 C2 describes a fastening arrangement for pressurized-gas vessels on a carrier system for divers. In this publication, 195 41 286 C2, a tension clamping bracket is shown as a locking element. In the disengaged state, the slack segment is passed through the clamping bracket for generating the belt tension and, by turning over the clamping bracket to the closed state, the belt position is held. To tension the belt and to fasten the pressurized-gas vessel on a carrying system, it is necessary to reduce the slack segment so far that the belt is tensioned tightly. The slack segment in the belt is the portion of a non-tensioned linear expansion of the belt which can be removed without elastic or plastic deformation by applying a tension force acting in the direction of tensioning along the circumference of the pressurized-gas vessel. After removing the slack, the belt lies tight and form-fit on the periphery of the pressurized-gas vessel. Since no elastic or plastic deformation has taken place yet, the belt is still not under tension to hold the pressurized-gas vessel on the carrying system. The pressurized-gas vessel is force-tightly connected to the carrying system by a further increase in tensile stress in the belt by a fold-stretch-mechanism.

U.S. Pat. No. 4,171,555 shows an alternative embodiment of a locking element for the fixation of textile belts wherein the slack segment of the belt must be passed through. The textile belt holds itself in position under tension via a redirection with a tooth-like structure arranged in the locking element.

To fasten the pressurized-gas vessel, three steps are necessary. In the first step, the slack segment of the belt is first passed through and subsequently the belt is tightened. In a second step, the belt is fixated in place under tension by the locking element. In a third step, the loose, previously passed through end is fixed either on the belt, for example, via a hook and loop fastener (VELCRO), or is fixed on the carrying system or on the pressurized-gas vessel.

The fixing of the loose end is necessary so that the diver does not get hung up on objects such as wreckage parts, tools or boat equipment and thereby run into danger.

SUMMARY OF THE INVENTION

It is an object of the invention to provide a fastening apparatus for pressurized-gas vessels on a carrying system with which it is possible to fasten the pressurized-gas vessel on the carrying system in one step.

The fastening apparatus of the invention is for at least one pressurized-gas vessel. The fastening apparatus includes: a carrier; a belt; the carrier having a redirection point and a first fastening point; the carrier being configured to accommodate the pressurized-gas vessel thereon between the first fastening point and the redirection point; a locking device having a second fastening point; the belt being guided in a loop-like form from the first fastening point through the locking device to the redirection point; the belt being redirected at the redirection point and guided to the second fastening point on the locking device; the locking device including a lever and an arrangement for guiding, holding and clamping the belt; and, the lever and the arrangement being disposed so that a stretching of the belt occurs because of a redirection of the belt in the lever and a tensioning of the belt by the lever so as to cause the stretching and the tensioning of the belt to effect a fastening of the pressurized-gas vessel.

According to another embodiment of the invention, the fastening apparatus includes: a carrier; a belt having first and second free ends; the carrier having a first fastening point and a redirection point; a locking device having a lever and a second fastening point; the belt passing over the locking device and the lever along a loop-like path; the first free end being fastened to the first fastening point and the second free end being fastened to the second fastening point with the belt being looped around the redirection point with the pressurized-gas vessel being disposed between the first fastening point and the redirection point; and, the lever being configured to clamp and stretch the belt to apply tension to the belt.

According to an embodiment of the invention, an arrangement of an elastic or partially elastic belt, a locking device as well as a carrier with a fastening point and a redirection point is provided for the belt.

The locking device includes: a clamping element; a holding element arranged for a belt passthrough; a lever; a lever joint; a fastening point; a frame; and, a guide element to accommodate the belt.

A fastening point and a redirection point for the belt are arranged on the carrier. The belt is guided from the fastening point for the belt on the carrier through the locking device to the redirection point for the belt on the carrier and is redirected at the redirection point for the belt and is guided to the fastening point on the locking device.

In the locking device, the belt is guided in the lever above a holding element and below a clamping element. The lever is arranged with a lever joint so that it can be moved into a rest position or a holding position. In the rest position, the belt is freely movable between the holding element and the clamping element. The entire locking device is freely movable along the length of the belt in the rest position, so that the belt length is adaptable to the dimensions of an object to be fastened (for example, a pressurized-gas vessel) via a displacement of the locking device along the circumference of the object to be fastened. Because of the displacement of the locking device, the remaining slack between the length of the belt and the vessel circumference is evened out, so that the belt lies in a form-locking manner on the circumference of the pressurized-gas vessel. When moving the lever into the holding position, the clamping device is flipped to the opposite-lying side of the holding element. Thereby, the belt is guided over the edges of the lever and clamping element and is brought into a fixed position from the freely movable position because of the redirection. The belt is shortened in length with the lever movement, since it is being immovably held between the clamping device and the holding element. This shortening of length results in an increased tension of the belt around the circumference of the pressurized-gas vessel, which leads to a fastening of the pressurized-gas vessel on the carrier. The elastic belt or the elastic portion of a partially elastic belt is thereby elastically stretched so far that the belt tightly holds the pressurized-gas vessel on the carrier. The elastic reset force in the belt is the tensioning force which holds the belt under tension.

The belt is preferably comprised of an elastic material.

A further possibility is a combination of a less elastic or non-elastic belt with a spring with the reset force being generated by the spring.

The spring is preferably arranged at the end of the belt toward the fastening point on the carrier. The free movability of the locking device around the circumference in the rest position results in the advantage during handling that, in one manipulative step, the belt length is adapted to the diameter of the pressurized-gas vessel via the displacement of the locking device and the pressurized-gas vessel is fastened in position by flipping the lever into the holding position.

A further advantage of the invention results from there being no free or loose end of the belt that needs to be secured by a hook and loop fastener (VELCRO). This results from the fixation of both ends of the belt on the fastening points of the locking device and the carrier.

In an especially advantageous embodiment, a securing element is arranged in the locking device, which secures the lever in the holding position and prevents an unintended movement from moving the lever into the rest position.

In a special embodiment, the fastening of the belt end on the fastening points on the carrier and/or the locking device is a connection that can be disengaged.

The fastening is achieved by a hook attached to the belt end which hooks into the fastening point.

In a further preferred embodiment of the invention, the fastening on the locking device and/or carrier is arranged as a connection that cannot be disengaged as a result of having a sewn loop.

In a further embodiment, the carrier is configured so that it can hold two pressurized-gas vessels.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
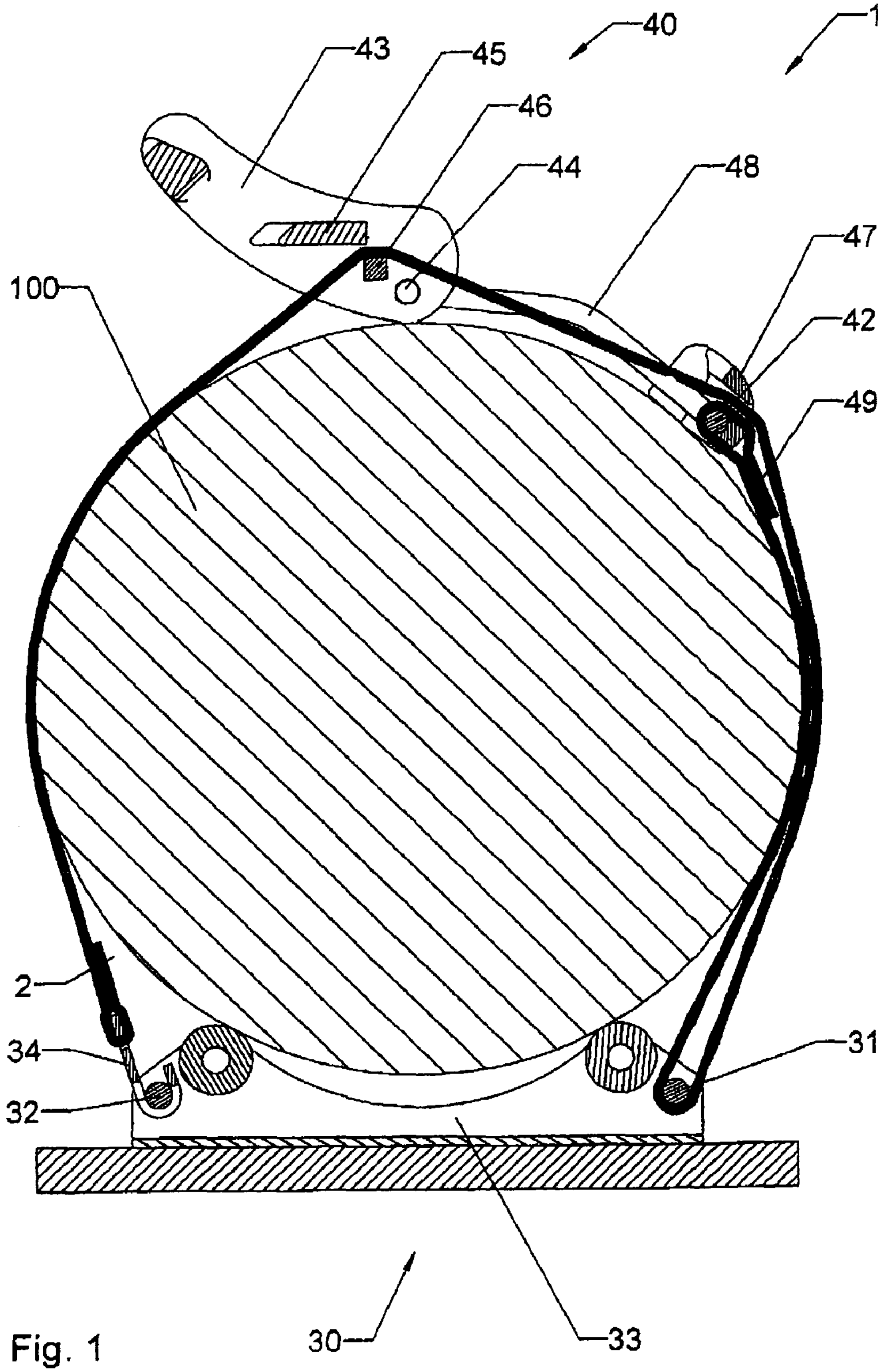
FIG. 1 is a schematic of a fastening apparatus for pressurized-gas vessels in a rest position.

FIG. 1 shows a fastening apparatus for pressurized-gas vessels on a carrying system for divers in its rest position. A fastening apparatus 1 accommodates a pressurized-gas vessel 100 and holds the pressurized-gas vessel 100 with a belt 2.

The pressurized-gas vessel 100 lies in an accommodating or receiving element 33 and in this rest position is not held tightly on a carrier 30 in the fastening apparatus 1. The carrier 30 comprises a first fastening point 32 and a redirection point 31 as well as the receiving element 33.

A locking device 40 comprises a frame 48, a lever joint 44, a lever 43, a clamping element 45 and a holding element 46 as well as a guide element 47 and a second fastening point 42 on the frame 48.

The locking device 40 comprises a frame 48, a lever joint 44, a lever 43, a clamping element 45 and a holding element 46 as well as a guide element 47 and a second fastening point 42 on the frame 48.

The belt 2 is guided from a first fastening point 32 on the carrier 30 through the locking device 40 to the redirection point 31 for the belt 2 on the carrier 30 and is redirected at the redirection point 31 and is guided back to a second fastening point 42 on the locking device 40.

The fastening of the belt end on the fastening points can be a separable or non-separable connection.

In the embodiment according to FIG. 1, the fastening at the first fastening point 32 is a separable connection in the form of a hook element 34 attached to a belt end which hooks into the fastening point 32.

The fastening of the second fastening point is a non-separable connection as a result of a sewn fastening loop 49 which is non-separably connected to a second fastening point 42. The guidance of the belt 2 occurs inside the locking device 40. The belt 2 is guided through the guiding element 47 along the frame 48 and the lever joint 44 to the lever 43. Inside the lever 43, the belt 2 is guided above a holding element 46 and underneath a clamping element 45. In the rest position, the belt 2 is freely movable between the holding element 46 and the clamping element 45. This makes possible a displacement of the locking device 40 on the circumference of the pressurized-gas vessel 100 and results in the ability to adapt to pressurized-gas vessels 100 with different diameters. With such a displaceable embodiment of the locking device 40, an adaptation can be made to the diameter of a pressurized-gas vessel in the range between about 110 mm to about 210 mm. To this end, a minimal belt length of about 400 mm is provided.

Figure 2:
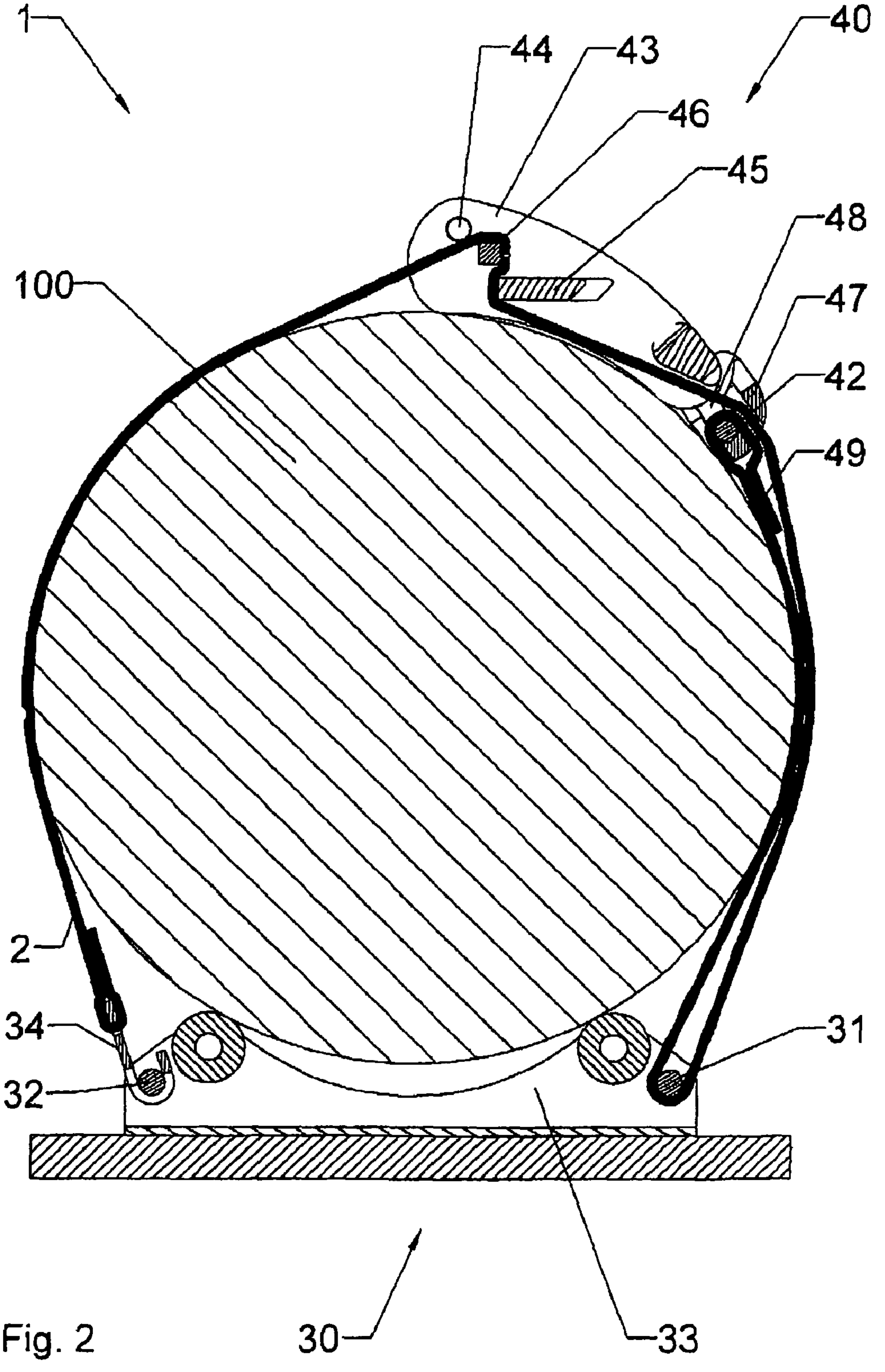
FIG. 2 is a schematic of the fastening apparatus for pressurized-gas vessels in a holding position.

FIG. 2 shows a fastening apparatus for a pressurized-gas vessel on a carrying system for a diver according to FIG. 1 wherein the holding position is shown.

The pressurized-gas vessel 100 lies in the receiving element 33 and is held tightly in this holding position on the carrier 30 in the fastening apparatus 1.

The same elements have the same numerals as in FIG. 1.

The guiding of the belt 2 is done in the same manner as described above in reference to FIG. 1.

The movement of the lever 43 from the rest position to the holding position leads to a redirection of the belt 2 around the edges of the clamping element 45 and the holding element 46.

The movement of the lever 43 from rest position to the holding position results in a redirection of the belt 2 inside the lever 43. This redirection effectively leads to a shortening of the length of the belt 2 along the circumference of the pressurized-gas vessel 100.

The shortening of the effective length of the belt 2 causes an increased tensioning of the belt 2 over the entire length and fastens the pressurized-gas vessel 100 in the receiving element 33 on the carrier 30.

Figure 3A:
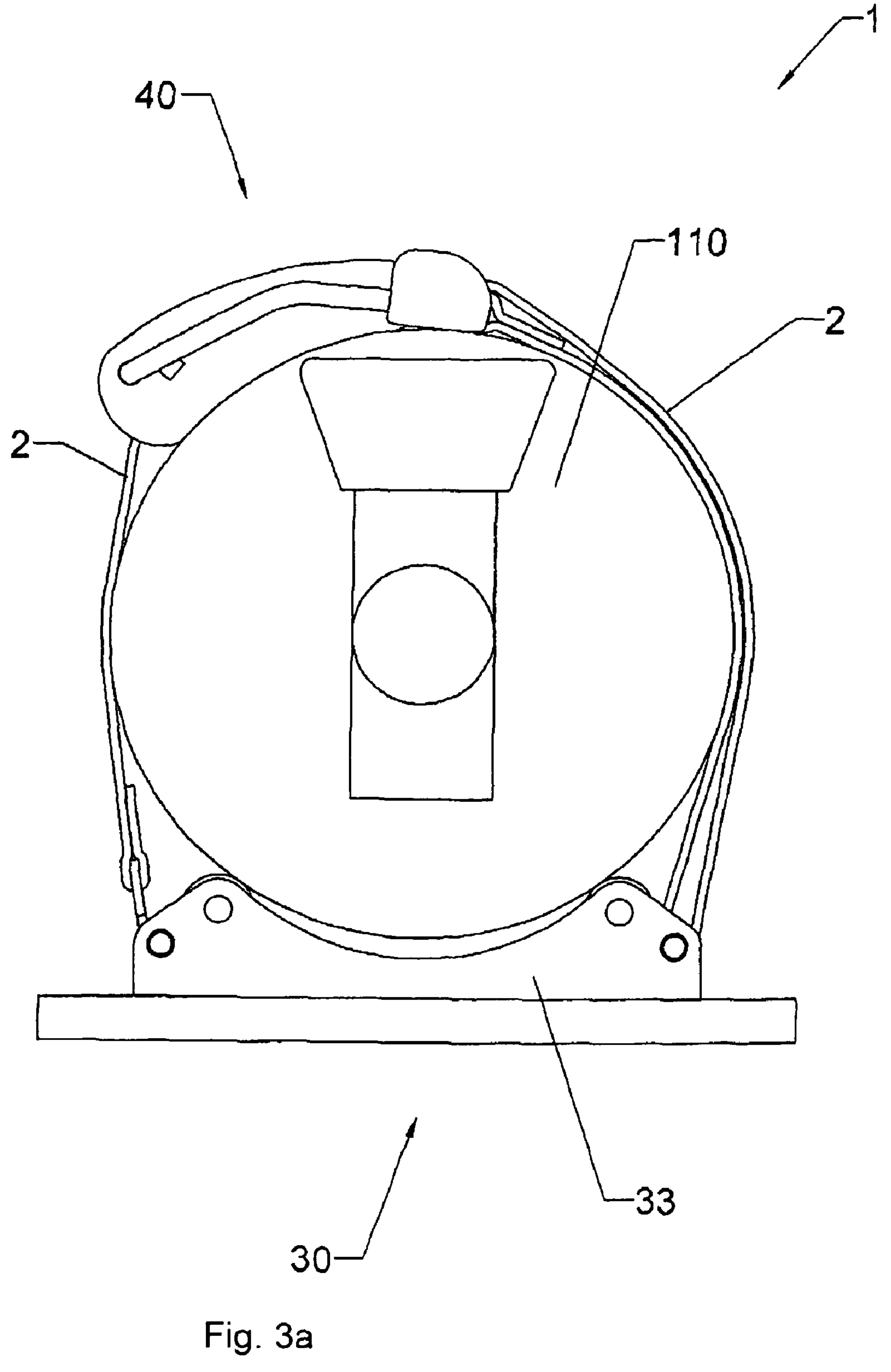
FIG. 3*a* is a schematic of a fastening apparatus for pressurized-gas vessels in a holding position.
Figure 3B:
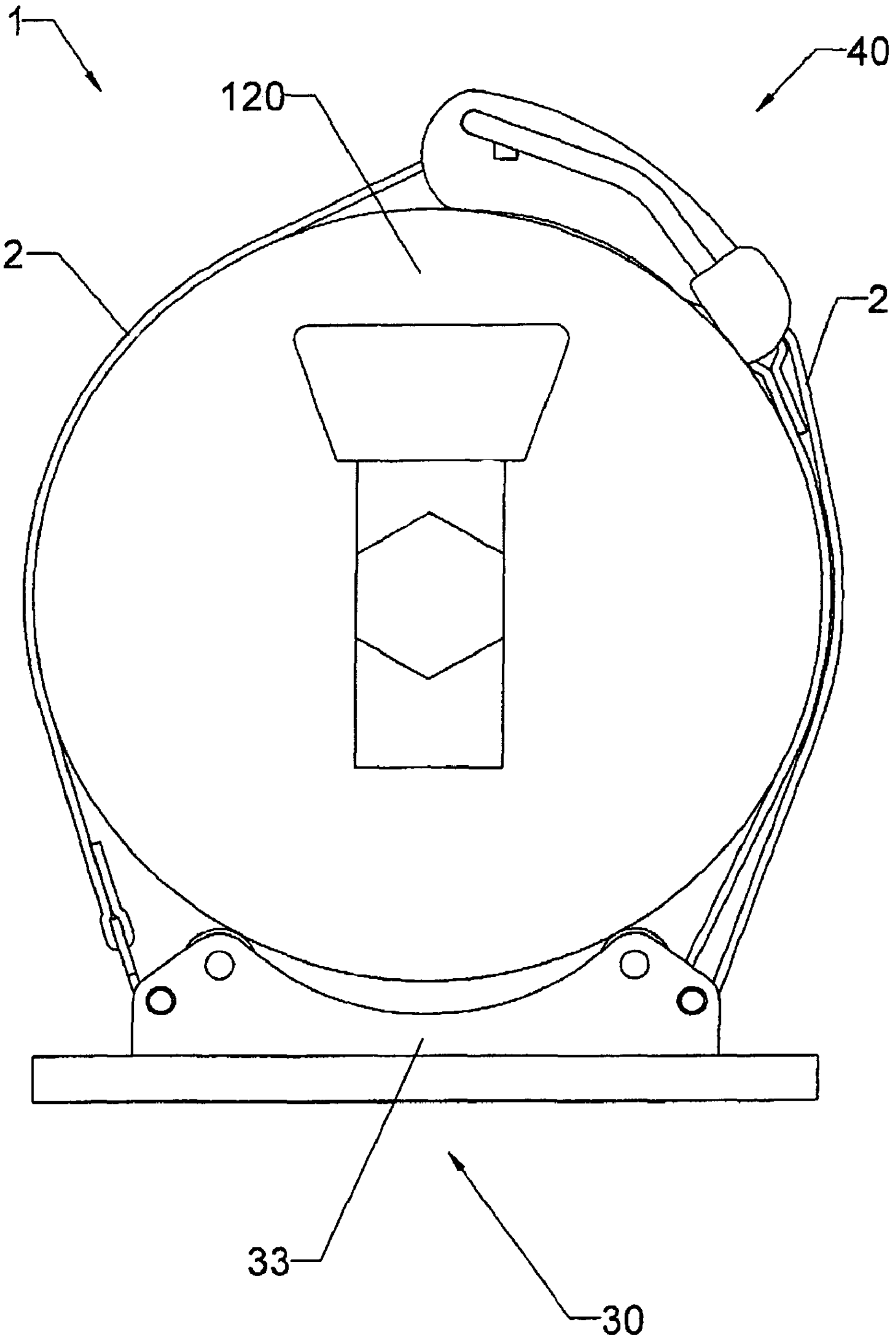
FIG. 3*b* is a schematic of the fastening apparatus for pressurized-gas vessels in a holding position having a greater diameter than the pressurized-gas vessel in FIG. 3*a*.

FIGS. 3*a* and 3*b* show a fastening of pressurized-gas vessels 100 having two different vessel diameters in a holding position.

FIG. 3*a* shows the fastening and the position of a pressurized-gas vessel 110 having a small diameter in the fastening apparatus 1. FIG. 3*b* shows the fastening and position of a pressurized-gas vessel 120 having a large diameter in the fastening apparatus 1. The pressurized-gas vessels (110, 120) lie on the receiving element 33 of the carrier 30. The locking device 40 is shown only schematically in FIGS. 3*a* and 3*b* without the individual elements in holding position shown in FIGS. 1 and 2.

The belt 2 tensions the pressurized-gas vessels (110, 120) on the circumference of the pressurized-gas vessels (110, 120) and holds the pressurized-gas vessels (110, 120) on the receiving element 33 of the carrier 30 in the holding position.

It is understood that the foregoing description is that of the preferred embodiments of the invention and that various changes and modifications may be made thereto without departing from the spirit and scope of the invention as defined in the appended claims.

What is claimed is:

1. A fastening apparatus for at least one pressurized-gas vessel, the fastening apparatus comprising: a carrier; a belt; a hook being attached to a free end of said belt; said carrier having a redirection point being configured to receive said belt and a first fastening point being configured to receive said hook; said carrier being configured to accommodate said pressurized-gas vessel thereon between said first fastening point and said redirection point; a locking device having a second fastening point, a lever, a guide element, a holding element and a clamping element; said belt being guided from said first fastening point through said locking device by passing once between said holding element and said clamping element to said redirection point; said belt being redirected at said redirection point and guided to said second fastening point; and, said holding element and said clamping element being disposed so that said belt is freely movable between said holding element and said clamping element in a rest position and said belt is immovably held between said clamping element and said holding element in a holding position.

2. The fastening apparatus of claim 1, wherein said guide element, said holding element and said clamping element are configured so that a shifting of said locking device along said belt in said rest position causes said belt to adapt its length to the dimensions of the pressurized-gas vessel.

3. The fastening apparatus of claim 2, wherein said locking device is so configured that the fastening of the pressurized-gas vessel to said carrier and the adaptation of said length of said belt occurs in response to a manipulative operation.

4. The fastening apparatus of claim 1, wherein said belt is non-releasably fastened with a loop to at least one of said locking device and said carrier.

5. The fastening apparatus of claim 1, wherein said belt is releasably fastened with a loop to at least one of said locking device and said carrier.

6. A fastening apparatus for at least one pressurized-gas vessel, the apparatus comprising: a carrier; a belt having first and second free ends; a hook being attached to said first free end of said belt; said carrier having a first fastening point being configured to receive said hook and a redirection point being configured to receive said belt; a locking device having a lever, a guide element, a holding element and a second fastening point; said belt passing through said locking device by passing once between said holding element and said clamping element; said first free end being separably fastened to said first fastening point by said hook and said second free end being non-separably fastened to said second fastening point with said belt being looped around said redirection point with the pressurized-gas vessel being disposed between said first fastening point and said redirection point; said lever being configured to clamp and stretch said belt to apply tension to said belt; and, said belt being freely movable between said holding element and said clamping element in a rest position and said belt being immovably held between said clamping element and said holding element in a holding position.

7. The fastening apparatus of claim 6, wherein said holding element and said clamping element are configured so that a shifting of said locking device along said belt in said rest position causes said belt to adapt its length to the dimensions of the pressurized-gas vessel.

8. The fastening apparatus of claim 7, wherein said locking device is so configured that the fastening of the pressurized-gas vessel to said carrier and the adaptation of said length of said belt occurs in response to a manipulative operation.

9. The fastening apparatus of claim 6, wherein said belt is non-releasably fastened with a loop to at least one of said locking device and said carrier.

10. The fastening apparatus of claim 6, wherein said belt is releasably fastened with a loop to at least one of said locking device and said carrier.

* * * * *